United States Patent [19]

Takada

[11] 4,256,332
[45] Mar. 17, 1981

[54] PASSIVE VEHICLE PASSENGER RESTRAINT SYSTEM

[76] Inventor: Juichiro Takada, 3-12-1, Shinmachi, Setagayaku, Tokyo, Japan

[21] Appl. No.: 45,173

[22] Filed: Jun. 4, 1979

[30] Foreign Application Priority Data

Aug. 1, 1978 [JP] Japan .................. 53-093135

[51] Int. Cl.³ .............................. B60R 21/10
[52] U.S. Cl. .................. 280/804; 280/808; 297/469
[58] Field of Search ........... 280/804, 803, 802, 808; 297/468, 469, 483

[56] References Cited

U.S. PATENT DOCUMENTS

| 3,830,518 | 8/1974 | Silber | 297/469 |
|---|---|---|---|
| 3,889,971 | 6/1975 | Kazaoka et al. | 280/804 |
| 3,968,978 | 7/1976 | Hayashi | 280/803 |
| 4,039,224 | 8/1977 | Bauer et al. | 297/469 |
| 4,070,040 | 1/1978 | Igeta | 297/469 |

*Primary Examiner*—Randolph A. Reese
*Assistant Examiner*—Donn McGiehan
*Attorney, Agent, or Firm*—Brumbaugh, Graves, Donohue & Raymond

[57] ABSTRACT

A passive vehicle occupant shoulder restraint belt is transferred between a restraint configuration and a release configuration by a guide ring which is moved by a driven transfer wire along a guide rail extending up from a restraint location partway down the vehicle center post and then forward along the edge of the roof above the door to a release location near the front post. A stop-anchor fastened to the post at the restraint location engages either the guide ring or the belt and holds the belt against pulling forces generated by a restrained occupant upon an abrupt change in the velocity of the vehicle.

6 Claims, 7 Drawing Figures

PASSIVE VEHICLE PASSENGER RESTRAINT SYSTEM

FIELD OF THE INVENTION

The present invention relates to vehicle occupant restraint belts and, in particular, to an improved passive restraint belt system which automatically transfers a restraint belt between an occupant-restraining configuration and an occupant-releasing configuration in response to closing and opening of a vehicle door.

BACKGROUND OF THE INVENTION

There have been numerous proposals for passive occupant restraint belt systems employing a shoulder belt extending from an inboard location adjacent the lower rear inboard part of the seat upwardly and outwardly across the seat to and through a guide ring that moves along a track above the door and then to an anchor or a retractor mounted on the roof generally above and behind the door. In such a system, the movable belt guide resides at a rearward location on the track above and behind the occupant when the door is closed, thus training the belt across the passenger's torso, and resides at a position close to or along the front post when the door is open, thus holding the upper outboard portion of the belt in a releasing configuration away from the occupant. One problem with such a system is that the restraint position of the movable anchor is some distance above the shoulder of the seat occupant and presents some chance that the belt will be pulled across the occupant's neck in the event of a collision or upset, a somewhat dangerous situation. The poor fitting of the belt to the occupant is a particularly acute problem with short persons.

An object of the present invention is to improve the safety of a shoulder belt in a passive belt system by providing for better fitting of the belt to the occupant.

SUMMARY OF THE INVENTION

In accordance with the present invention, a passive vehicle occupant restraint belt system comprises a shoulder belt leading from an inboard location adjacent the lower rear portion of the seat to an outboard location where the end is connected to the vehicle body. A guide rail extends along the edge of the vehicle roof above the door from adjacent front post back to the center post and then partway down the center post. A belt guide ring is slidable along the guide rail between a restraint location partway down the center post and a release location adjacent the front post. A portion of the belt intermediate the aforementioned inboard and outboard locations passes slidably through the guide ring. A transfer wire coupled to the guide ring drives the guide ring between the restraint and release locations. A stop-anchor is affixed to the center post at the restraint location of the guide ring and includes a portion which engages the guide ring or the belt at that location to hold the belt against pulling forces generated by a restrained occupant upon an abrupt change in the velocity of the vehicle that would otherwise throw the occupant forwardly, upwardly or both.

In a preferred embodiment of the invention, one end of the belt is connected to an emergency locking retractor. The guide ring includes a slider which is received in the guide rail and a ring which is movably attached to the slider so that the slider can shift in position in accordance with the alignment of the belt.

In another embodiment of the invention, there is a second guide ring which is movable along the guide rail and receives a portion of the belt. An abutment on the transfer wire engages the second guide ring to move it from the restraint location to a location adjacent the upper end of the center post where the guide rail turns forward toward the front post, i.e., at the bend in the guide rail, when the first guide ring is moved to the release location adjacent the front post. The second guide ring disengages from the abutment on the transfer wire when the first guide ring moves back to the restraint location and is stopped by the stop-anchor at the restraint location. The aforementioned embodiment is particularly useful in a system in which the outboard end of the belt is wound onto a retractor located below the step-anchor at the lower end of the guide rail, inasmuch as the second guide ring holds the portion of the belt between it and the first guide ring up against the roof above the door opening.

The stop-anchor may take various forms. In one form it is a metal plate which has a notch in its upper edge which receives a portion of the belt guide ring. Portions of the plate on either side of the notch overlie adjacent portions of the guide ring. The stop-anchor may also be a metal plate which has a tab that extends up and is received within the guide ring. In a third form a metal plate has a tab which overlies the belt generally transversely at the restraint location of the guide ring. In another embodiment the stop-anchor is a metal anchor ring through which the belt passes in leading from the outboard location to the movable guide ring.

For a better understanding of the invention, reference may be made to the following description of exemplary embodiments, taken in conjunction with the figures of the accompanying drawings.

DESCRIPTION OF EXEMPLARY EMBODIMENTS

Figure 1:
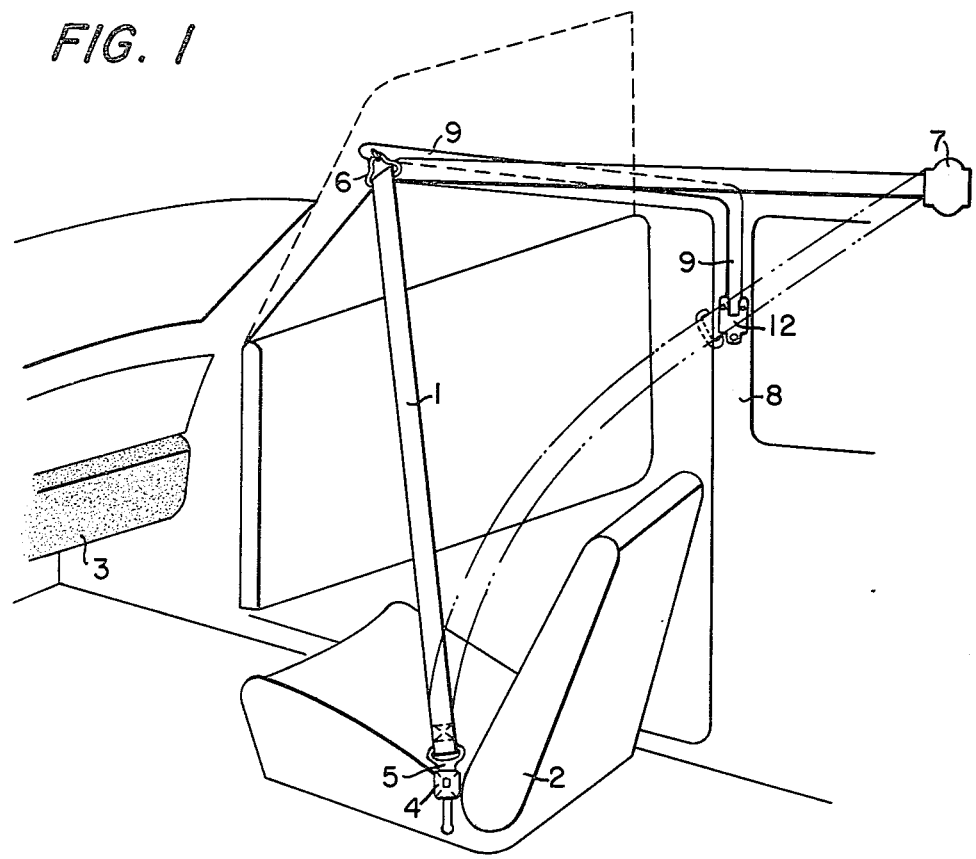
FIG. 1 is a schematic, pictorial view of an embodiment of the invention.

The passive occupant restraint system shown in FIG. 1 comprises a shoulder belt 1 associated with the front passenger seat 2 for restraining the torso of an occupant of the seat and an energy-absorbing knee bolster 3 for protecting the passenger's legs. The shoulder belt leads from an inboard location adjacent the lower rear portion of the belt, the inboard end of the shoulder belt being secured to an emergency release buckle 4 by a tongue 5. The belt then leads upwardly and outwardly across the seat to and through a movable guide ring 6 and thence to an emergency locking retractor 7 fastened to the vehicle roof above the level of and some distance behind the door opening of the vehicle body. The movable guide ring 6 is movable from a restraint location partway down the center post 8 of the vehicle body (as shown in phantom lines in FIG. 1) to a release position adjacent the upper front corner of the vehicle door (as shown) or partway down the front post along a path defined by a guide rail 9. The belt guide ring 6 comprises a ring part which is received for more or less universal motion by a slider part 10 (see FIG. 2). The slider part 10 is a fitting having a portion which projects out through a continuous slot 9a in the wall of the guide rail 9 and is attached to a transfer wire 11 which is driven back and forth along the track by a suitably located and suitable type of drive device, such as a gear-reduced electric motor or a mechanical motion amplifier. The drive device may be located on the vehicle body in front of the door or in the door, in which case the transfer wire 11 leads upwardly along the front post, then forwardly along the guide rail 9 and then down the center post, or it can be mounted in the vehicle body behind the door below and behind the restraint location of the belt guide ring. Various types of drive devices, the places where they are located, and ways of controlling their operation are known in the art and can be used in connection with the present invention.

An important aspect of the invention is the provision of a stop-anchor at the restraint location which performs two function (as the term applied to it implies): first, it serves as a stop to locate the belt guide ring 6 at the proper location and, second, it serves as an anchor in that it securely locates an upper outboard portion of the belt in a position in which the belt properly fits the occupant and holds the outboard position at such position against pulling forces on the belt generated by a restrained occupant upon an abrupt change in the velocity of the vehicle which tends to thrust the passenger forward or upward. It is well-known that such forces are considerable.

Figure 2:
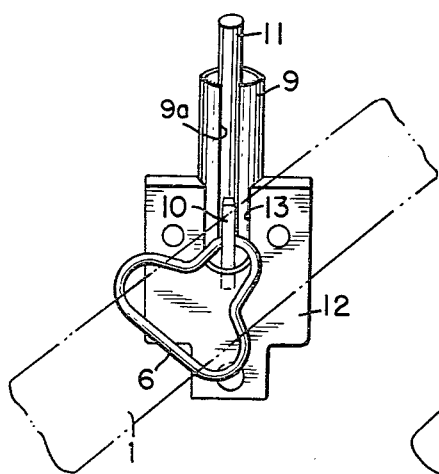
FIG. 2 is a front pictorial view of the guide ring and stop-anchor of the embodiment shown in FIG. 1.

Accordingly, in one embodiment of the invention, as shown in FIG. 2, a stop-anchor 12 in the form of a strong plate is strongly fastened to the center post 8 at the restraint location of the outboard portion of the belt. The stop-anchor 12 has a notch 13 in its upper edge which is in register with the slot 9a in the rail and opens upwardly to accept the outwardly extending part of the slider portion 10 of the belt guide ring 6. Portions of the stop-anchor on either side of the notch 13 overlie the tubular guide rail and the fitting which constitutes the slider portion of the guide ring 6. Accordingly, when the belt guide ring 6 is at the restraint location, as shown in FIG. 2, the slider part of the guide ring is located behind the stop-anchor and is held against even the large forces that it must endure in the event of a collision or upset.

Figure 3:
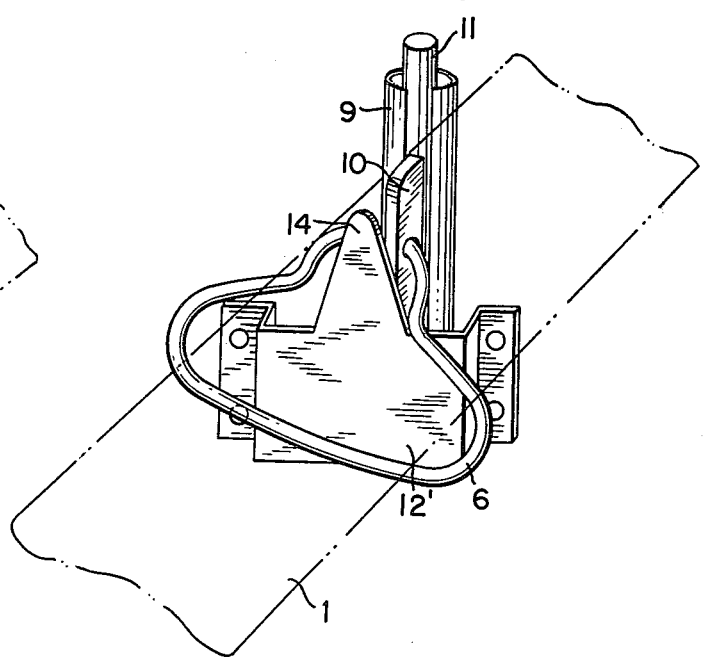
FIG. 3 is a front pictorial view of another form of stop-anchor.

In another embodiment of the invention, as shown in FIG. 3, the arrangement of FIG. 2 is modified insofar as a different stop-anchor 12' is affixed strongly to the center post 8. The stop-anchor 12' is a generally U-shaped metal plate which is fastened to the post 8 and has a tongue 14 extending from its upper edge. It is set out from the guide rail 9 a sufficient distance to permit the slider portion 10 of the guide ring 6 to slide down behind it. In that position, the slider portion and a portion of the ring past of the guide ring are held behind the tongue portion 14 of the stop-anchor. Accordingly, the stop-anchor 12', in a manner similar to the stop-anchor 12 of FIG. 2, stops and anchors the outboard portion of the belt at the restraint location against pulling forces generated in the belt by a restrained occupant in the event of a collision or upset.

Figure 4:
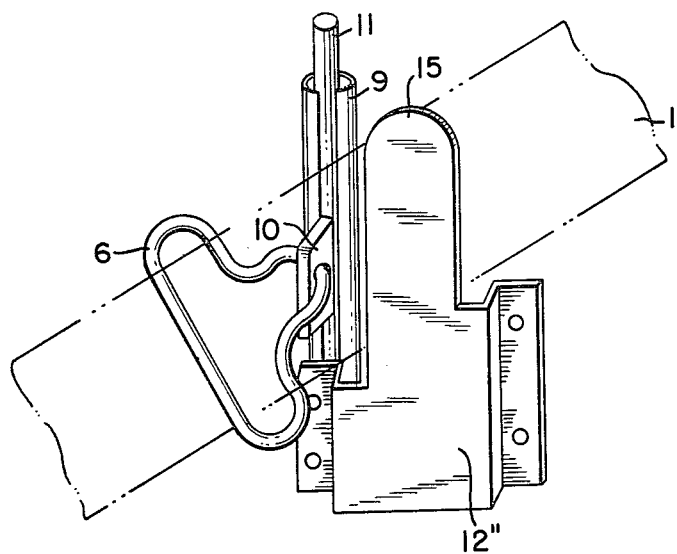
FIG. 4 is a front pictorial view of a third stop-anchor.

A third embodiment of the invention, as shown in FIG. 4, includes another form of stop-anchor 12" at the restraint location. It is a strong specially-shaped steel plate and is securely fastened to the center port 8 of the vehicle. A tongue portion 15 extends upwardly generally to the rear of but closely adjacent the guide rail 9. The tongue portion is set in from the center post 8 so that when the belt is transferred to the restraint configuration (see FIG. 1) a portion of the belt 1 (see FIG. 4) lies behind the tongue 15. As in the other embodiments, the stop-anchor 12" holds an outboard portion of the shoulder belt at a restraint location partway down the center post for good fitting of the belt to the torso of the occupant of the seat and resists the strong pulling forces that are generated in the belt by a restrained occupant upon an abrupt change in the velocity of the vehicle.

Each of the embodiments of the invention functions according to the same principles. First, each stop-anchor 12, 12' or 12" establishes a restraint location of an outboard portion of the belt at a position at a proper height, relative to the distance behind the occupant, so that the belt will lead diagonally across the occupant's chest and over his shoulder and will not engage his neck, even if there is a "plunging" effect involved in the movement of his body in a collision or upset. Secondly, each stop-anchor is a strong member strongly attached to the vehicle body to endure the high pulling forces generated in the belt by a restrained occupant in a collision. (More accurately, the pulling force of the belt is divided between the emergency locking retractor 7 and the stop-anchor.)

Figure 5:
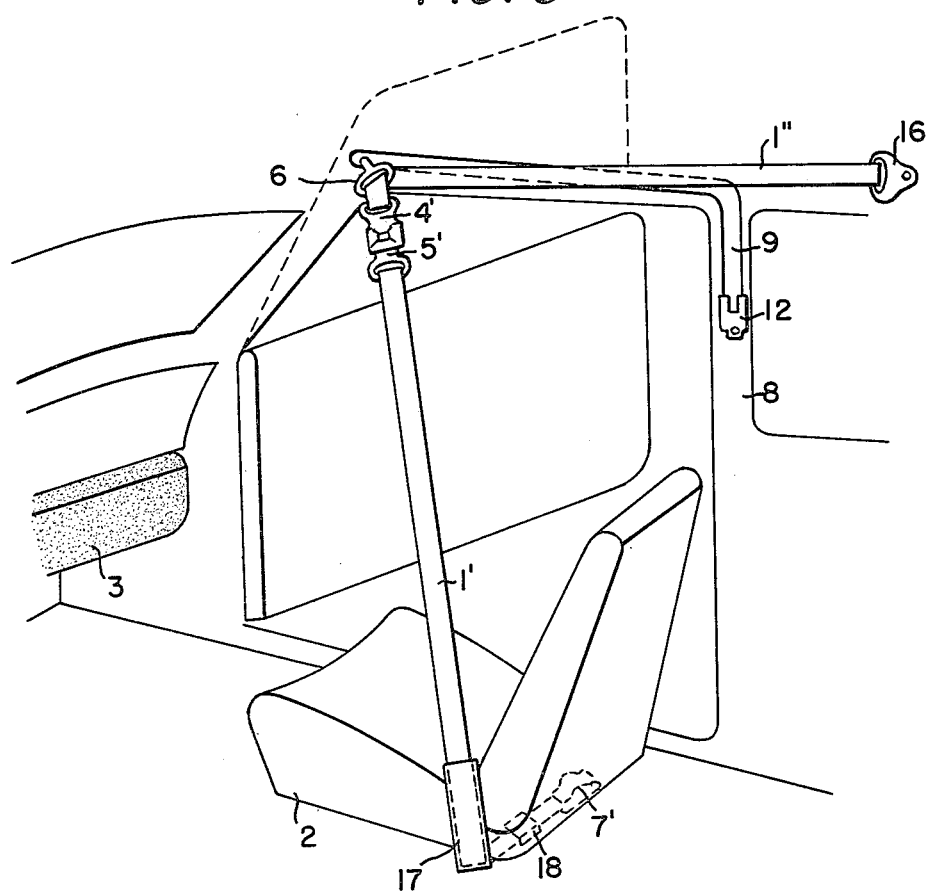
FIG. 5 is a schematic, pictorial view of another embodiment of the invention.

The belt system can be modified in various ways. For example, in the system shown in FIG. 5, a control belt 1' leads laterally in from an emergency locking retractor 7' fastened to the vehicle floor underneath the rearward portion of the seat through a belt clamp 18, upwardly through a guide 17 located on the inboard side of the seat, and then diagonally upwardly and outwardly across the seat to an end which is affixed to the ring portion of a buckle tongue 5'. A shoulder belt 1" is anchored at one end to an anchor 16 fastened to the outboard part of the vehicle roof some distance behind the center post 8, leads through the belt transfer guide 6 and is fastened at its other end to a ring on an emergency release buckle 4'. As shown in FIG. 5, this embodiment of the invention has a stop-anchor of the type shown in FIG. 2 of the drawings, but any of the abovedescribed stop-anchors, as well as various modifications and variations of these stop-anchors, can be used at the restraint location of the outboard portion of the belt.

In the releasing configuration of the belt system, which is the configuration shown in FIG. 5, the control belt 1' is pulled from the retractor 7'. At the same time as the transfer guide ring 6 is moved to the release position at the front of the track 9, the shoulder belt 1" is pulled up and forward so that it lies generally along the roof above the door. When the transfer guide 6 is moved to the restraint location, the retractor 7' winds up the major portion of the control belt 1', thereby pulling the tongue 5' and the buckle 4' into a position very close to the guide 17. In that position the shoulder belt 1" leads from an inboard location close to the guide 17 diagonally across the front of the passenger and over his shoulder to the restraint location established by the stop-anchor 12.

Figure 6:
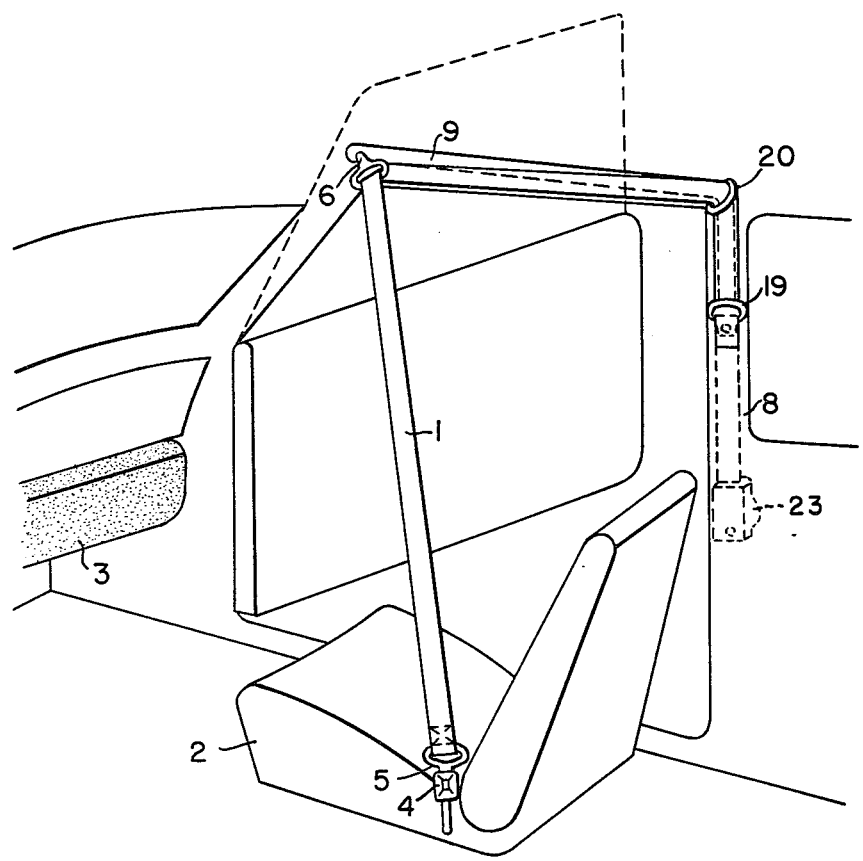
FIG. 6 is a schematic, pictorial view of a third embodiment of the invention.
Figure 7:
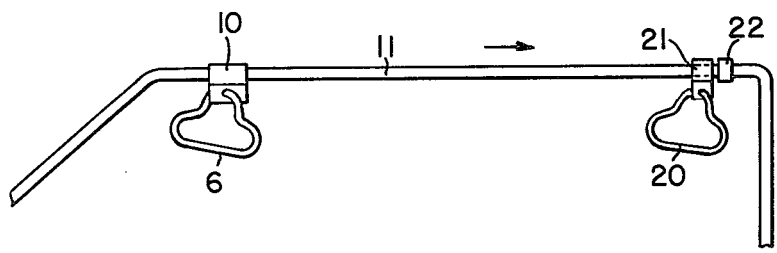
FIG. 7 is a schematic, elevational drawing of the transfer wire and belt guide components of the system shown in FIG. 6.

Still another belt system which embodies the principles of the invention, as shown in FIGS. 6 and 7, comprises a belt 1 which leads from a buckle tongue 5 that is releasably attached to a buckle 4 on the inboard rearward portion of the seat 2 across the seat and upwardly to a belt transfer guide 6 that is movable between release and restraint locations at the forward and rearward ends, respectively, of a track 9. As shown in FIG. 7, the slider portion 10 of the belt transfer guide ring 6 is secured partway along a transfer wire 11. A second transfer guide ring 20 is mounted by means of a slider part 21 that is received within the track 9 but which is not affixed to the wire 11. Instead the wire passes freely through a hole through the slider portion 21. An abutment 22 is fastened to the transfer wire 11 at a distance behind the slider part 10 of the transfer guide ring 6 substantially equal to the distance between the bend where the guide rail 9 turns downwardly along the center post 8 and the front release location of the transfer guide 6. The belt 1 passes freely through the ring parts of the guide rings 6 and 20 to and through a stop-anchor 19 and finally to an emergency locking retractor 23 enclosed within the center post trim at a suitable location below the stop-anchor 19. The stop-anchor 19 is a ring which is strongly fastened to the center post 8 at the restraint location through which the belt passes, as mentioned above.

In the release configuration of the belt system of FIG. 6, which is the configuration shown, the stop-anchor, of course, remains stationary at the restraint location of the outboard portion of the belt for safe and comfortable fitting of the belt to the occupant. The guide 20 is positioned at the bend in the guide rail 9 and the belt transfer guide 6 is pulled forward to the forward end of the guide rail 9. To attain the restraint configuration of the belt system, the transfer wire 11 is driven in the direction indicated by the arrow, i.e., from left to right (as shown in FIG. 7), thereby carrying with it the transfer guide ring 6. The transfer wire 11 will move through the hole in the slide part 21 of the belt transfer guide 20 until it has moved a distance approximately equal to the distance between the abutment 22 and the slider part 10, at which point the slider part 10 of the transfer guide ring 6 will contact the slider part 21 of the second transfer guide ring 20. As the transfer wire 11 continues to move toward the restraint configuration of the system, both guides 6 and 20 will be driven toward the restraint position in which the ring parts of both guides 6 and 20 will be brought rearwardly and downwardly to positions immediately adjacent and generally in register with the stop-anchor 19. In the restraint configuration 19, therefore, an outboard portion of the belt is stopped and strongly anchored in an advantageous position from the points of view of both safety and comfort.

When the belt system is again transferred to the release configuration (see FIG. 6), the transfer wire will be pulled forward in the direction opposite to the arrow shown in FIG. 7, thereby first pulling the transfer guide ring 6 up and then forward partway along the guide rail 9. Meanwhile, the transfer guide 20 remains at the restraint location until the abutment 22 reaches the restraint location and contacts the slider part 21 of the transfer guide 20. At that point the two transfer guides 6 and 20 will both be moved until the positions shown in FIG. 6 are attained.

The above-described embodiments are intended to be merely exemplary, and numerous variations and modifications will be readily apparent to those skilled in the art without departing from the spirit and scope of the invention. All such variations and modifications are intended to be included within the scope of the invention, as defined in the appended claims.

I claim:

1. A passive vehicle occupant restraint belt system comprising a shoulder belt leading from an inboard location adjacent the lower rear portion of the seat to an outboard location where it is connected to the vehicle body; a guide rail extending along the edge of the vehicle roof above the door from adjacent the front post to the center post and thence partway down the center post; a belt guide ring movable along the guide rail between a restraint location partway down the center post and a release location adjacent the front post and receiving a portion of the belt; a transfer wire coupled to the guide ring and adapted to be driven to move the guide ring between the restraint and release locations; and a stop-anchor affixed to the center post at the restraint location of the guide ring and including a portion which is engageable with one of the guide ring and the belt to hold the belt against pulling forces generated in the belt by a restrained occupant upon an abrupt change in the velocity of the vehicle, the stop-anchor being a metal plate having a notch in its upper edge which receives a portion of the belt guide ring and portions on either side of the notch that overlie and engage portions of the guide rail.

2. A passive vehicle occupant restraint belt system comprising a shoulder belt leading from an inboard location adjacent the lower rear portion of the seat to an outboard location where it is connected to the vehicle body; a guide rail extending along the edge of the vehicle roof above the door from adjacent the front post to the center post and thence partway down the center post; a belt guide ring movable along the guide rail between a restraint location partway down the center post and a release location adjacent the front post and receiving a portion of the belt; a transfer wire coupled to the guide ring and adapted to be driven to move the guide ring between the restraint and release locations; and a stop-anchor affixed to the center post at the restraint location of the guide ring and including a portion which is engageable with one of the guide ring and the belt to hold the belt against pulling forces generated in the belt by a restrained occupant upon an abrupt change in the velocity of the vehicle, the stop-anchor being a metal plate having an upwardly extending tab which is received within and engaged by the guide ring.

3. A passive vehicle occupant restraint belt system comprising a shoulder belt leading from an inboard location adjacent the lower rear portion of the seat to an outboard location where it is connected to the vehicle body; a guide rail extending along the edge of the vehicle roof above the door from adjacent the front post to the center post and thence partway down the center post; a belt guide ring movable along the guide rail between a restraint location partway down the center post and a release location adjacent the front post and receiving a portion of the belt; a transfer wire coupled to the guide ring and adapted to be driven to move the guide ring between the restraint and release locations; and a stop-anchor affixed to the center post at the restraint location of the guide ring and including a portion which is engageable with one of the guide ring and the belt to hold the belt against pulling forces generated in the belt by a restrained occupant upon an abrupt change in the velocity of the vehicle, the stop-anchor being a metal plate having an upwardly extending tab which overlies and engages the belt generally transversely.

4. A restraint belt system according to any of claims 1 to 3 wherein one end of the belt is connected to an emergency locking retractor.

5. A restraint belt according to any of claims 1 to 3 the guide ring includes a slider part received in the guide rail and a ring part movably attached to the slider part.

6. A restraint belt according to any of claims 1 to 3 and further comprising a second guide ring which is movable along the guide rail and receives the belt and wherein an abutment on the transfer wire engages the second guide ring to move it from the restraint location to a location adjacent the upper end of the vehicle center post when the first guide ring is moved to the release location, and wherein the second guide ring disengages from the abutment on the transfer wire and is stopped by the stop-anchor at the restraint location when the first guide ring moves back to the restraint location.

* * * * *

UNITED STATES PATENT AND TRADEMARK OFFICE
CERTIFICATE OF CORRECTION

PATENT NO. : 4,256,332
DATED : March 17, 1981
INVENTOR(S) : Juichiro Takada

It is certified that error appears in the above-identified patent and that said Letters Patent are hereby corrected as shown below:

Col. 2, l. 18, "step-anchor" should be --stop-anchor--; l. 63, "belt" (first occurrence) should be --seat--; col. 3, l. 28, "function" should be --functions--; l. 64, "past" should be --part--; col. 4, l. 6, "port" should be --post--; and col. 7, l. 7, insert "wherein" before "the" (first occurrence).

Signed and Sealed this

Eighth Day of September 1981

[SEAL]

Attest:

GERALD J. MOSSINGHOFF

Attesting Officer    Commissioner of Patents and Trademarks